Oct. 7, 1952  L. C. HEIMGARTNER ET AL  2,612,972
SEALING STRIP
Filed July 8, 1949  2 SHEETS—SHEET 1
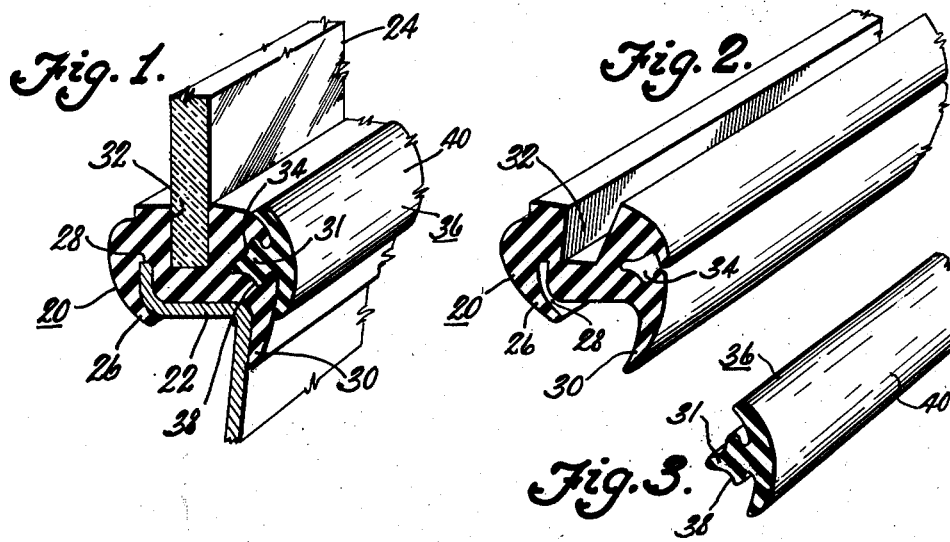
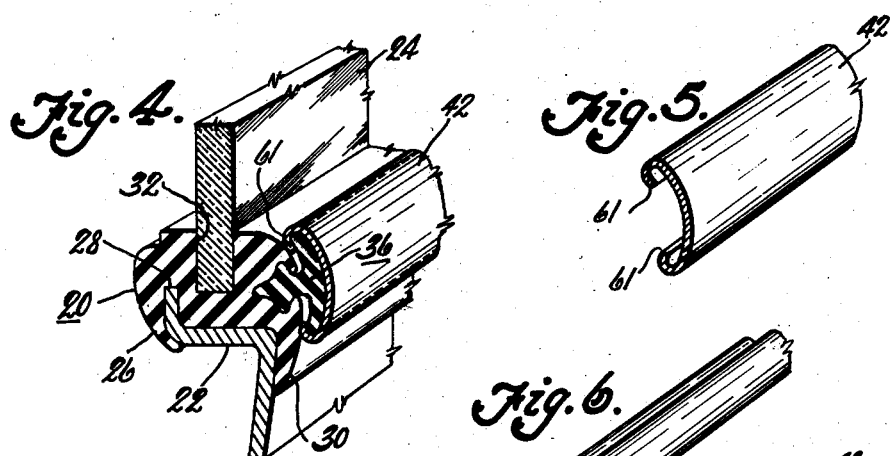
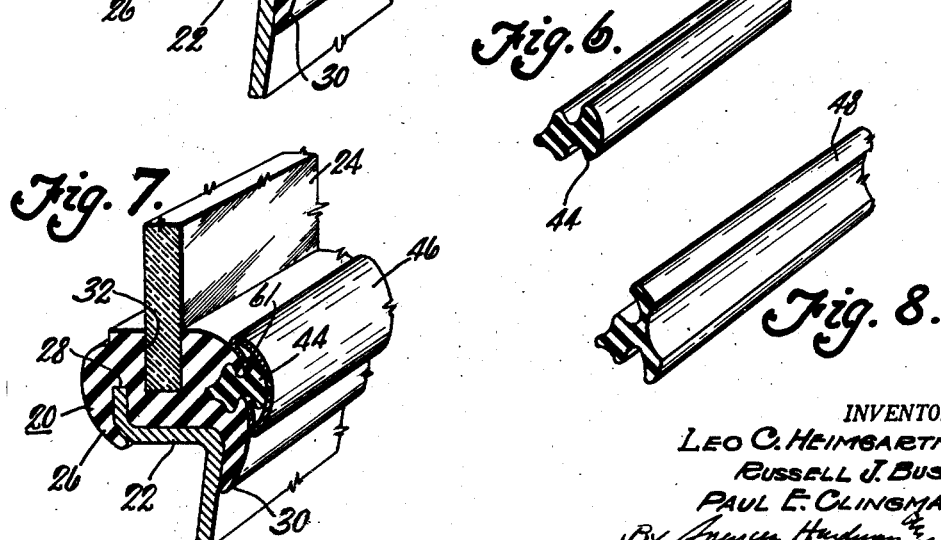
INVENTOR.
LEO C. HEIMGARTNER
RUSSELL J. BUSH &
PAUL E. CLINGMAN
BY *Spencer Hardman by John*
*their* ATTORNEYS Oct. 7, 1952     L. C. HEIMGARTNER ET AL     2,612,972
SEALING STRIP
Filed July 8, 1949     2 SHEETS—SHEET 2
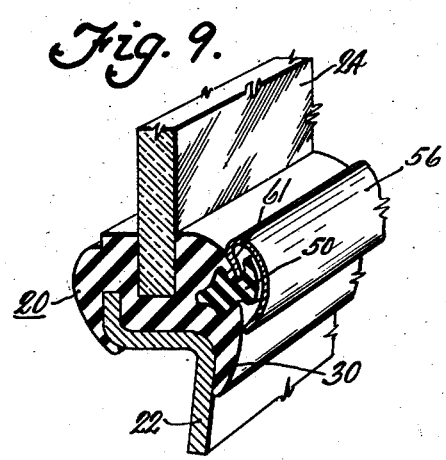
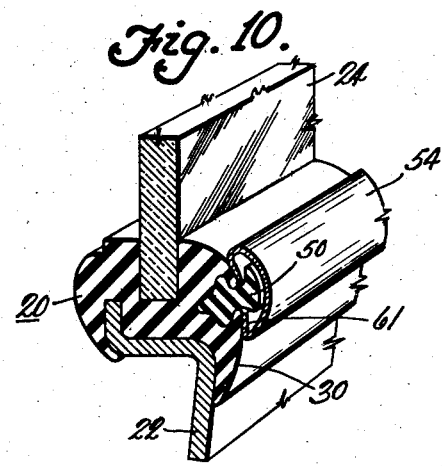
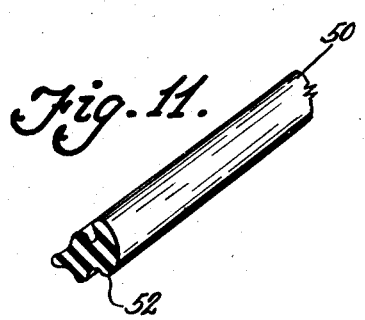
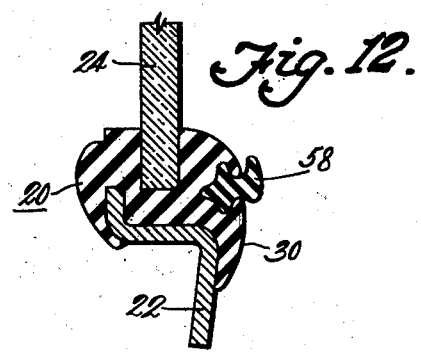
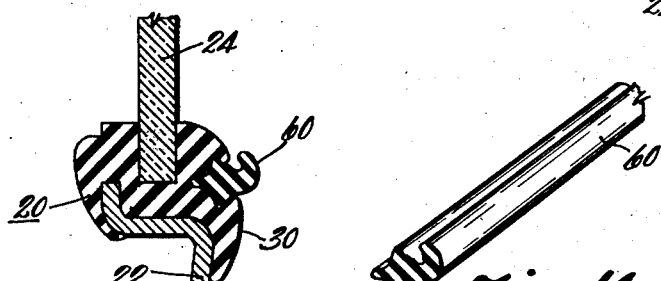
INVENTORS
LEO C. HEIMGARTNER
RUSSELL J. BUSH &
PAUL E. CLINGMAN
BY
their ATTORNEYS Patented Oct. 7, 1952

2,612,972

UNITED STATES PATENT OFFICE 2,612,972

SEALING STRIP

Leo C. Heimgartner, Russell J. Bush, and Paul E. Clingman, Dayton, Ohio, assignors to General Motors Corporation, Detroit, Mich., a corporation of Delaware Application July 8, 1949, Serial No. 103,652

1 Claim. (Cl. 189—78)

This invention relates to connector strips and is particularly concerned with resilient connector strips including filler strips or wedging strips which carry an ornamental trim or the like.

It is therefore a primary object of the invention to provide a connector strip of the Eichner type as disclosed in Patents Nos. 2,189,137 and 2,189,138, which includes a filler strip that acts as a wedge for sealing the connector strip to the parts connected and which filler strip also includes means thereon for attaching ornamental molding, such as, trim molding and the like, used in connection with automotive body applications.

A further object of the invention is to provide a sealing strip of the Eichner type which is supplied with a resilient filler strip that includes an up-turned ear thereon of longitudinal extent capable of acting as attaching means for a trim molding.

Further objects will be apparent from the following description, reference being made to the accompanying drawings, wherein:

Fig. 1 is a fragmentary view, in perspective, of a portion of the connector strip in position for mounting a pane of glass within an aperture in the sheet metal body.

Fig. 2 is a fragmentary view, in perspective, of the connector strip shown in Fig. 1 with filler strip removed.

Fig. 3 is a fragmentary view, in perspective, of the filler strip used in connection with the connector strip shown in Fig. 2.

Fig. 4 is a view of the glass and sheet metal assembly connected by means of a similar type of connector strip to that shown in Fig. 1, but utilizing a different type of filler strip.

Fig. 5 is a fragmentary perspective view of a portion of the trim molding used in connection with the filler strip shown in Fig. 4.

Fig. 6 is a modification of the filler strip as used in connection with the assembly shown in Fig. 7.

Fig. 7 is a view similar to Fig. 4 of a modified form of the present invention.

Fig. 8 is another modification of the filler strip design.

Fig. 9 is a fragmentary perspective view of an assembly showing still another type of filler strip with trim molding in place.

Fig. 10 is a modification in molding design from that shown in Fig. 9.

Fig. 11 is a fragmentary perspective view of the filler strip used in connection with Figs. 9 and 10.

Fig. 12 is a view, in section, of an assembly of glass and sheet metal with the connector strip showing the filler strip in Fig. 11 in place.

Fig. 13 is a similar assembly to that shown in Fig. 12 with a slightly modified filler strip.

Fig. 14 is a view, in perspective, of the filler strip used in connection with the assembly shown in Fig. 13.

Connector strips of the Eichner type, as disclosed in Patents Nos. 2,189,137 and 2,189,138 owned by the assignee of the present invention, are used effectively in many applications and particularly in automotive body applications as a means for mounting panels, windshields, windows and the like within apertures in sheet metal or wooden bodies. The connector strips are made from resilient rubber-like material which cushions the shock of road vibrations and thus provides an ideal mounting for the glass. Furthermore, the Eichner type strips are easy to install and it is a simple matter to position the glass within the strip whereupon the glass is maintained in the strip through the use of the filler strip or wedge which, when in place, forces resilient flanges on the connector strip into sealing relation with the glass and the body. In this manner, the glass portions are held in sealed condition against weather and also maintained resiliently connected to the body so that vibrations and shocks are minimized.

In late model automobiles, it has been found desirable to include a trim molding as a means of ornamentation and for completely or partially covering a connector strip, thus adding a more finished appearance to the car. These trim moldings are normally electroplated strips of metal and are adapted to be held in place by various means so as to at least partially cover the connector strip and in most cases completely cover the filler strips. The means used in the past for this attachment have been clips inserted between the glass and the connector strip. Obviously, these clips spread the connector strip and cause a leak which permits rain to enter the car. In order to obviate this difficulty, rubber cement has been used around the clips. It is apparent that this method of attachment is not entirely satisfactory since it entails additional work and also presents the possibility of leakage.

The present invention is directed to an entirely different attack of the broad problem of attaching trim moldings to connector strips. We have found that the trim moldings may be satisfactorily attached to the filler strip if the filler strip is properly designed for this attachment. Also, we have found that filler strips may be used as molding per se. In this instance, however, the trim molding is not metal but is generally merely a different colored rubber-like compound.

Referring specifically to the drawings, Fig. 1 shows a connector strip 20 attached to a sheet metal body 22 and connecting body 22 to a pane of glass 24. The connector strip 20 includes an ear 26 which forms a groove or channel 28 with the remainder of the strip into which a portion of the body 22 is inserted. The strip 20 also includes a lip 30 for sealing against another portion of the sheet metal body 22. Within the strip 20 is a longitudinal groove 32 to accommodate the pane of glass 24. There is also included a second longitudinal groove 34 for the filler strip. Fig. 2 shows the connector strip without the filter strip in place. In this connection, it will be noted that the groove 32 and the groove 34 are of different shape when the connector strip is not in place. This permits easy assembling of the glass into the groove 32 since the groove 32 is opened up when the filler strip is not in place. In this particular instance, the filler strip 31, as shown in Fig. 3, includes a wedge portion 38 adapted to fit within the groove 34 and a molding or facing portion 40. The entire strip 36 can be made of a different colored rubber than the remainder of the connector strip 20. When the wedge portion 38 is within the groove 34, the groove 32 is confined so that the pane 24 is adequately sealed. Suitable tools for inserting the filler strip are well known in the art. Fig. 4 shows a modification of the design wherein the filler strip, as shown at 36, may have the edges of the facing portion 40 spread outwardly so that a metal trim molding 42 may be snapped thereover.

Fig. 7 shows still another embodiment of the invention wherein the filler strip, as shown at 44, is used to accommodate a trim molding 46.

Still another embodiment of the filler strip is shown at 48 in Fig. 8. Figs. 9 and 10 depict another application of the invention wherein the filler strip has an upwardly extending longitudinal lip or hook portion thereon, as shown in Fig. 11, at 50, and a smaller downwardly extending lip or hook portion 52. This accommodates a trim molding 54 shown in Fig. 10, which may be snapped in place. If the lower lip 52 is removed, the trim molding may be utilized, as shown at 56 in Fig. 9. In this instance, however, if the molding is not continuous, for example, as used with a windshield, it is not held to the connector strip. However, the single lip 50 adequately maintains molding in place wherein the molding is continuous such as that used in connection with the windshield window or the like. Figs. 12 and 13 show still further modifications and designs of filler strips as noted at 58 and 60 respectively, the filler strip 60 being shown in perspective in Fig. 14.

In all cases, the trim molding may include inwardly turned lips thereon for clipping over the filler strip lips which are resilient whereby the molding may be pressed in place quite easily after the glass is positioned and the filler strip is in place. The present design has still another advantage, when a pane of glass is broken, it is merely necessary to dislodge the trim molding from the filler strip which is easily accomplished with a screw-driver or other suitable tool due to the resiliency of the filler strip after which the filler strip is pulled out of the channel or groove 34 which permits the fragments of glass to be easily removed from the connector strip. A new pane is put in place and the filler strip again positioned within the groove 34 through the use of a suitable assembly tool after which the trim molding can be manually snapped in place over the filler strip. This presents a very simple assembly and replacement problem which can be adequately solved by any auto service establishment without the necessity of expensive tools, the use of rubber cement or other expedients that are often not available.

While the embodiments of the present invention as herein disclosed, constitute preferred forms, it is to be understood that other forms might be adopted.

What is claimed is as follows:

A connector strip of elastic deformable rubber-like material having continuous longitudinal grooves, adapted to receive portions of two members to be joined, said connector strip also having a continuous longitudinal hollow into which one wall of one of said grooves is movable to facilitate assembling the strip on the two members, an auxiliary strip of elastic deformable rubber-like material having a continuously extending wedge portion of substantially the same shape as said hollow and insertable into said hollow throughout its length to spread the material of said connector strip and force it into pressure engagement with said members, said auxiliary strip having integral continuously extending flexible flanges thereon overlying and concealing said wedge portion and a metal trim strip having its marginal edges extending around the edges of said integral flexible flanges in gripping relation therewith for holding the metal trim strip to the connector strip.

LEO C. HEIMGARTNER.
RUSSELL J. BUSH.
PAUL E. CLINGMAN.

REFERENCES CITED

The following references are of record in the file of this patent:

UNITED STATES PATENTS

| Number | Name | Date |
| --- | --- | --- |
| 1,961,352 | Hall | June 5, 1934 |
| 2,189,138 | Eichner | Feb. 6, 1940 |
| 2,350,430 | Ulrich | June 6, 1944 |
| 2,492,566 | Geyer | Dec. 27, 1949 |
| 2,497,276 | Scott et al. | Feb. 14, 1950 |

FOREIGN PATENTS

| Number | Country | Date |
| --- | --- | --- |
| 100,311 | Great Britain | Feb. 17, 1937 |